W. H. REICHARD.
COMBINED SAFETY CIRCUIT CONTROLLER AND INDICATION MEANS FOR ELECTRIC INTERLOCKING AND TRAFFIC CONTROLLING SYSTEMS.
APPLICATION FILED FEB. 26, 1915.

1,289,263.

Patented Dec. 31, 1918.
3 SHEETS—SHEET 1.

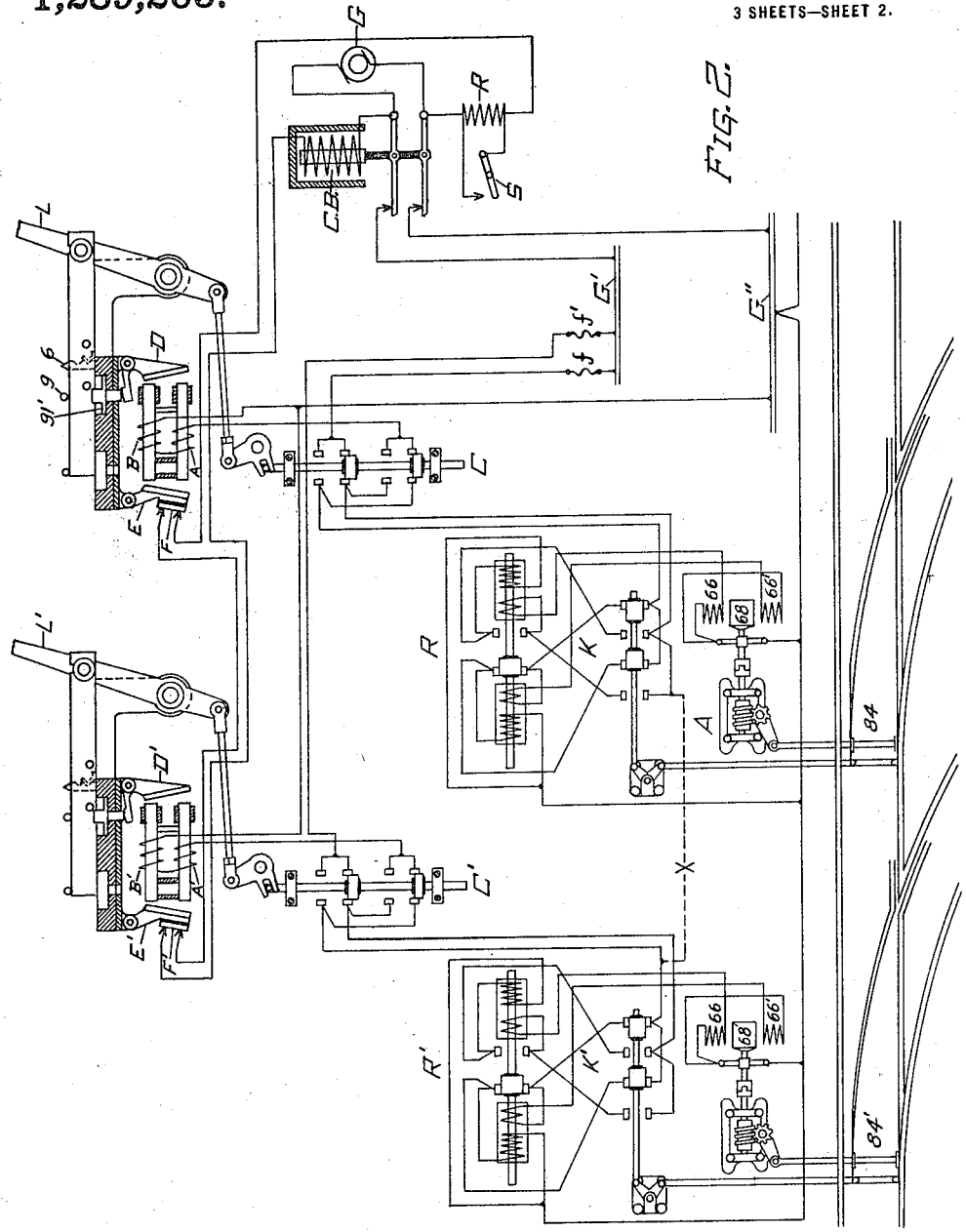

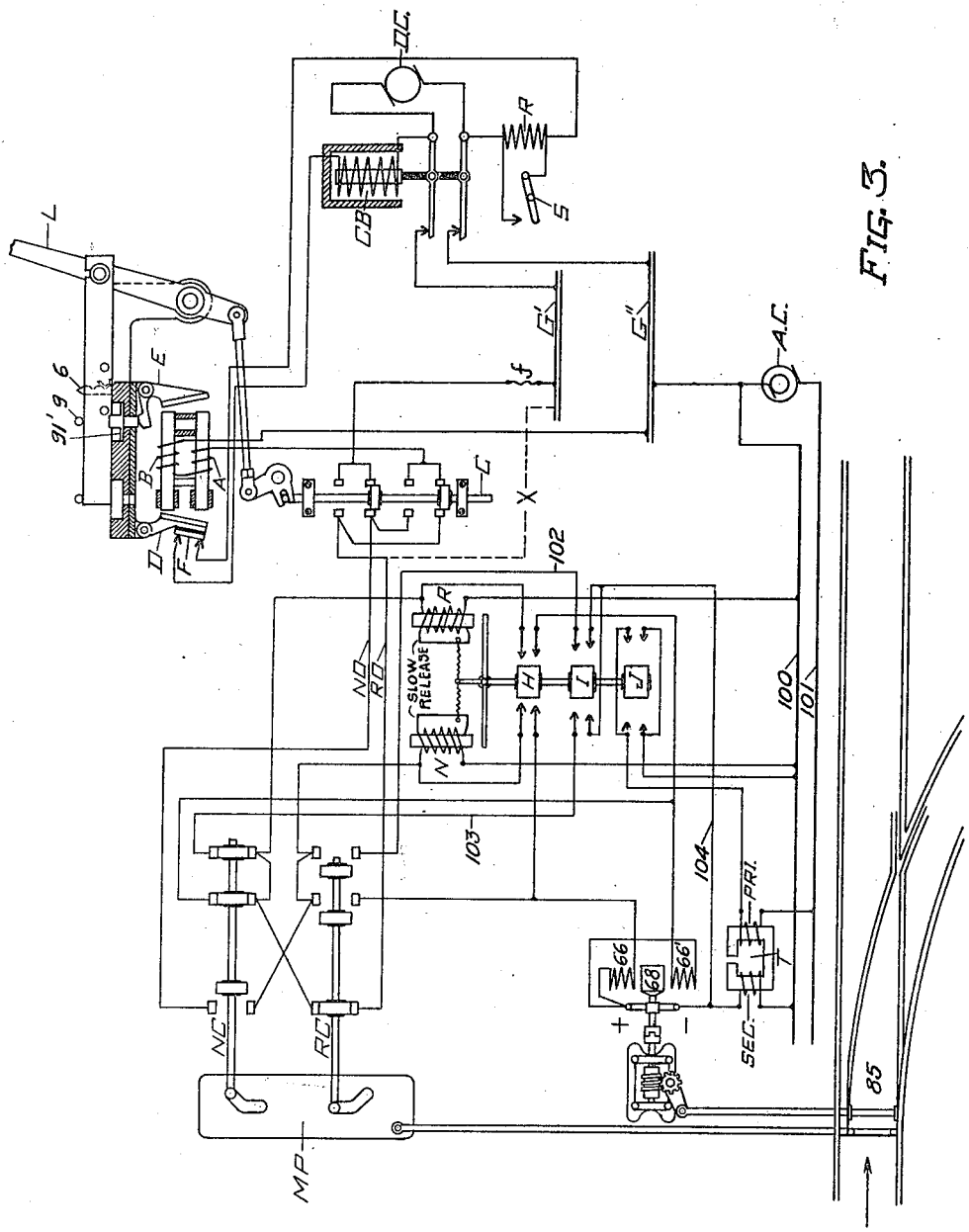

UNITED STATES PATENT OFFICE.

WADE H. REICHARD, OF TROY, NEW YORK, ASSIGNOR TO FEDERAL SIGNAL COMPANY, A CORPORATION OF NEW YORK.

COMBINED SAFETY-CIRCUIT CONTROLLER AND INDICATION MEANS FOR ELECTRIC INTERLOCKING AND TRAFFIC-CONTROLLING SYSTEMS.

1,289,263.  Specification of Letters Patent.  Patented Dec. 31, 1918.

Application filed February 26, 1915. Serial No. 10,760.

*To all whom it may concern:*

Be it known that I, WADE H. REICHARD, a citizen of the United States of America, residing at the city of Troy, in the county of Rensselaer and State of New York, have invented certain new and useful Improvements in Combined Safety-Circuit Controller and Indication Means for Electric Interlocking and Traffic-Controlling Systems, of which the following is a specification.

My invention relates to traffic controlling systems and more especially interlocking systems, and it has for its object to provide in such systems a device which is used for the dual purpose of providing an indication means and a control for a safety circuit. The function of the device as a safety circuit controller is to protect against the unauthorized application of a source of energy to the wires leading to one device of the system from the live or energized wires leading to another device. The function of the device as an indicating means is to release, at the proper time, mechanical or electrical detents which are employed in electric interlocking systems.

This device is especially useful for protecting against crosses in such a system as shown in Patent #1,099,469, issued to me under date of June 9th, 1914, which discloses the operation of electric interlocking systems having alternating current as the prime source of operating energy and using continuous currents for indicating purposes. By applying the device which is the subject of this invention to such a system, I am able to make the same coil which performs the indicating function also protect against improper application of energy from the wires of one device to those of another device.

In electric interlocking systems wherein the prime source of operating energy is of direct current, if the indicating source of energy in such a system is of alternating current energy, then this same device may be therein applied with the same advantages as mentioned above, viz: that the same coil which is used for indicating purposes may be made to serve the purpose of protecting the system against crosses of wires leading to one device of the system with those leading to another device. In other words, this combined indicating device and safety circuit controller is made to do these two purposes and thus effect great economies and the utmost as regards reliability.

Fig. 2 shows diagrammatically the circuits and controlling device for an electric interlocking or traffic controlling system operated by alternating current and having direct current indication and in which is inserted the device shown in Fig. 1, which comprises the subject matter of this invention.

Fig. 3 shows diagrammatically the circuits and controlling device for an electric interlocking or traffic controlling system operated by direct current and having alternating current indication.

Figure 1:
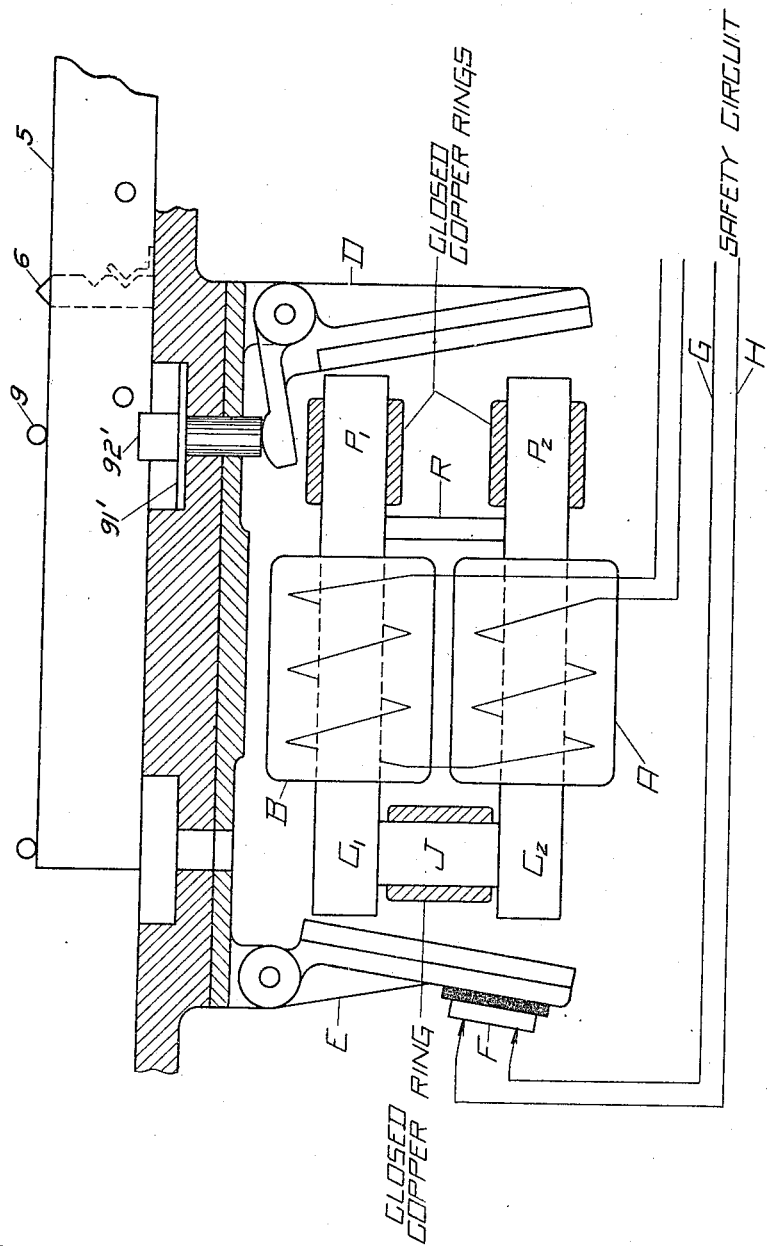
Figure 1 shows a side elevation of a combined indication and safety circuit controlling device.

These figures are further described below in greater detail.

It will be noted in Fig. 1 that there is a magnetic core surrounded by energizing coils, A and B, which are connected in series and when carrying currents of electricity will set up magnetic effects within the cores, $C^1$ and $C^2$. At the right of Fig. 1 is an armature, D, adapted to be attracted to the cores, $C^1$ and $C^2$, when continuous current is traversing the coils, A and B; and at the left of Fig. 1 is armature, E, which is adapted to be attracted to the cores, $C^1$ and $C^2$, when the coils, A and B, are traversed by an alternating current of electricity. The armature, E, carries, insulated therefrom, an electrical contact, F, which is adapted to electrically connect the two wires, G and H, when the armature, E, is not attracted to the cores, $C^1$ and $C^2$. Thus it will be apparent that armature, D, will respond to direct current within the coils, A and B, and armature, E, will respond to alternating current within the coils, A and B, and this is true because the cores, $C^1$ and $C^2$, are connected at their left-hand extremities by the magnetic bridge, J, which is surrounded by a closed copper ring as shown in Fig. 1, and the polar extensions, $P^1$ and $P^2$, at the right of Fig. 1 are also surrounded as shown, with closed copper rings. There is also connecting the cores at the right-hand end a small magnetic bridge, R; that is, R, is of small cross section as compared with the cross section of $C^1$ and $C^2$.

Due to this form of construction, when direct currents traverse the coils, A and B, the magnetic flux will flow from core, $C^1$ to $C^2$, by way of the magnetic bridge, J, and also some flux will flow from polar extensions, $P^1$ to $P^2$, through the magnetic bridge, R, but the greater portion of the flux will cross the air gaps at the polar extensions, $P^1$ and $P^2$, and attract armature, D. This then will permit armature, D, to lift the indication head, 91', and if the indication dog, 6, had been forced down into the recess by the bar, 9, it would lift the dog, 6, out of the recess, thus releasing the slide bar, 5, permitting a movement of the said slide bar, 5, to the position as shown in the drawing of Fig. 1. This explains then how the coils, A and B, are enabled to perform the indicating function by means of direct current traversing the said coils.

If we now consider alternating current is traversing coils, A and B, the rapid alternation of the magnetic flux caused by the said alternating currents will set up currents in the closed copper rings surrounding the magnetic member, J, and the polar extensions, $P^1$ and $P^2$. These currents in the said copper rings will choke back the flux tending to pass through magnetic bridge, J, and polar extensions, $P^1$ and $P^2$, and the said flux will then cross the air gap to armature, E, and not to armature, D, so that the armature, E, will be attracted and the contact, F, will interrupt the continuity between wires, G and H, of the safety circuit. Therefore, if alternating current be applied to the coils, A and B, armature, E, will be attracted. It will be perfectly evident as shown in Fig. 3 that by reversing the cores, $C^1$ and $C^2$, so that the magnetic bridge, J, is adjacent to armature, D, and the polar extensions, $P^1$ and $P^2$, are adjacent to armature, E, that the alternating current could be used for indicating purposes and the direct current could be used for interrupting the continuity of the safety circuit through the wires, G and H, and contact, F.

In Fig. 2 I have shown two switches, 84 and 84', together with the control circuits as disclosed in Patent #1,099,469, granted to me June 9th, 1914, connected in a system to alternator, G, and in place of coils, I and S, of the said patent, I am substituting an indicating and safety circuit controller device as shown in Fig. 1; armature, D, being adapted to be energized by direct currents and lift the dog, 6, and armature, E, being adapted to be operated by means of alternating current and opening the safety circuit at contact, F, when so energized. The currents which flow from generator, G, to the bus bars, G', G'', are controlled through an electro-magnetic device, CB, which is energized by means of generator, G, through the several contacts, F and F', of the levers, so that it is necessary that contacts, F and F', must be closed before the energy of the generator, G, is available at the bus bars, G', G''.

The above mentioned circuit, through the contacts, F and F', etc., controlling the device CB, is called a safety circuit. L, is a lever for the control of switch, 84, and L', is a lever for the control of 84'; both levers being equipped with electric circuit controllers, C and C', together with proper controlling device operated at switch, 84, and 84', for the purpose of cutting off the control circuits when the switches have responded to the movement of the levers, L and L', and for closing proper indicating circuits to energize armature, D and D', by means of continuous currents which are generated by the armatures, 68 and 68', when the switch has so responded to the movement of the lever as disclosed in Patent No. 1,099,469, granted to me under date of June 9th, 1914.

If now we assume that bus bar, G', is positive with reference to bus bar, G'', for the sake of illustration, and we also assume that a cross exists as shown in the dotted line, X, between the control wire of switch, 84, which is connected through fuse, $f$, to bus bar, G', and a control wire connected to switch, 84', which wire is also connected through the windings, 66', and the armature, 68', to bus bar, G'', and the said wire is also connected through contacts on the controller, C', to magnets A' and B', to bus bar, G'', then alternating current will flow through the field winding, 66', and armature, 68' which would tend to move the switch, 84'. Such movement of the switch would be unauthorized and dangerous. However, current would also flow from the cross, X, to the circuit controller, C', thence to the magnets, A', B', back to bus bar, G''. This current, however, would be an alternating one since the prime source of energy, G, is of the alternating current type and such flow of alternating current as described above in connection with Fig. 1, would interrupt the safety circuit at contact, F', thus releasing the main circuit breaker, CB, and disconnecting the source of energy, G, from the bus bars, G' and G''. Since the operation of armature, E', is very much more sensitive than that of the motor of switch, 84', such disconnection from the source of energy would take place practically instantaneously upon the completion of the dotted circuit, X, thus affording protection against improper or unauthorized movement of the switch, 84', at times when its controlling lever, L', has not been operated.

Referring now to Fig. 3, wherein I have shown a system for an electric interlocking system operated by means of continuous current obtained from the generator, DC, and having a source of alternating current energy, AC, for the purpose of indicating that the operated units have responded to the corresponding movements of the controlling levers. L, is an operating lever equipped with a detent dog, 6, arranged to be pressed within the recess by means of bar, 9, whenever lever, L, is moved to change the position of the circuit controller, C, to which the lever, L, is connected as shown in Fig. 3. The purpose of the controller, C, as will be well understood by one familiar with the art, is for connecting the wires, NO and RO, alternately to bus bar, G', through the fuse, f, and to bus bar, G", in series with magnets, AB, of the combined safety circuit and indication device. When positive energy is supplied to wire, NO, from bus bar, G', this energy will flow to the controller, NC, operated by track switch, 85, and thence through the contacts thereon to the winding, 66, of the switch motor having armature, 68, to operate the track switch, 85, to the position desired. This current will return to bus bar, G", over wire, 100, and thence through the contacts of the electrically controlled switch, CB, to the generator, DC. It will be apparent also that if the circuit controller, C, be moved so that positive energy be furnished from bus bar, G', to wire, RO, that current will flow through the contacts of the reverse circuit controller, RC, to the field winding, 66', of the motor having armature, 68, thence through the said armature, 68, to winding, SEC, of the transformer, T, to wire, 100, thence to bus bar, G", and back to generator, DC. Current will also flow through magnet, R, and cause its armature to be attracted throwing the swinging contacts into engagement with the wires connected with the points on the right thereof as shown in Fig. 3. Since alternating generator, AC, is furnishing energy to wires, 101 and 100, contact, J, when closed by means of magnet, R, will complete the circuit from wire, 100, to winding, PRI, of indication transformer, T; contact, I, will close a circuit from the negative brush of commutator of armature, 68, to wire, 102, leading to a contact as shown on reverse circuit controller, RC. This contact is shown open in the position of the switch, 85, on the drawing, but when the switch, 85, has been moved to the position so that the track rails will lead to the right, motion plate, MP, will have been moved upward on the drawing so that the contact carrying bar of RC will have been shifted to the right, thus disconnecting wire, RO, from the circuits leading to the motor having armature, 68. At such a time it will be seen that wire, 102, will be connected to field winding, 66, so long as contact, H, is closed. This will cause the armature of switch motor, 68, to be dynamically braked. Simultaneously with this occurrence of dynamic braking the secondary, SEC, of indication transformer, T, will cause current to flow over wire, 104, to contact, I, to wire, 102, to the right-hand contact of reverse circuit controller, RC, which is now closed, thence to the left-hand contact of controller, NC, which also is closed, thence to wire, NO, which is now connected by means of circuit controller, C, to magnets, A and B, to bus bar, G", to wire, 100, back to the secondary winding, SEC, of indication transformer, T. This last mentioned circuit comprises an alternating indicating circuit and consequently such energization by means of alternating currents of magnets, A and B, will attract armature, E, lifting the indication head, 91', to disengage the indication dog, 6, from the recess into which it has been forced by means of bar, 9. The shifting of the circuit controller, RC, having disconnected magnet, R, and motor windings, 66', and armature, 68, will permit of the contacts, H, I and J, to swing to the vertical position, thus disconnecting the primary winding by means of contact, J, from the alternating generator, AC. When the contacts, H, I and J, are drawn in electrical connection with the corresponding contacting elements by means of the energization of the coils, R and N, respectively, they overlap or "wipe" upon the said contacting elements in such a manner that an appreciable time interval exists between the deënergization of the magnets, R or N, and the disengagement of the contacts, H, I and J, with their respective elements. Also, if desired, the magnets, R and N, may be made slow releasing in the manner well known in the art. It will be seen that if it is now desired to set the switch, 85, for the straight track as shown in Fig. 3, it will first be necessary to move the lever, L, into such a position as will connect wire, NO, to the positive bus bar, G', and wire, RO, to the magnets, A and B, and to the bus bar, G". Before such a condition of circuit controller, C, can obtain, it will be seen that bar, 9, will depress dog, 6, into the recess provided. This will afford a detent to further movement of the lever, L, until the switch, 85, has been moved to a corresponding position and the magnet, N, has again connected the primary of the indication transformer, T, to the source of energy, AC, and also has connected indication transformer secondary, SEC, to the wire, RO, upon the completion of the movement of the circuit controllers, NC. This will cause, as described above, alternating current to flow to the circuit controller, C, by means of wire, RO. This alternating current will also flow, of course, through magnets, A and B, to bus bar, G″, etc., again attracting armature, E, for the purpose of releasing dog, 6.

Now for the purpose of describing the function of armature, D, we will assume that positive energy be supplied directly by means of the cross shown in the dotted lines, X, from positive bus bar, G′. This improper connection of bus bar, G′, to wire, RO, would conduct direct current from generator, DC, to wire, RO, and thence to winding, 66′, to armature, 68, to secondary winding, SEC, to wire, 100, to bus bar, G″. Such a current flow would, of course, tend to move the switch, 85, without a corresponding movement of lever, L. Such a movement would be unauthorized and dangerous. It will also be seen, however, that current will also flow from cross, X, to wire, RO, through circuit controller, C, to magnets, A and B, and thence to bus bar, G″. This continuous current would magnetize the pole faces to attract armature, D, because such a current flow through magnets, A and B, would be from the continuous current generator, DC. Since the armature, D, carries insulated therefrom the contact, F, an attraction of armature, D, to the pole face would interrupt the holding circuit of the electro-magnet, CB, permitting it to become deënergized and therefore opening its contacts and disconnecting continuous current generator, DC, from bus bars, G′ and G″; thus disconnecting the prime source of supply from the devices of the system and preventing an unauthorized movement of the switches connected therein. It will be clear that this system may be extended to embrace any number of switches similar to track switch, 85, each one of which would be controlled through its corresponding lever, L, and circuit controller, C. Along with each lever, L, would go a corresponding contact, F, on armature, D, all of which contacts would be connected in a circuit in series with the magnet, CB, so that it would be necessary to have all contacts in the above mentioned circuit closed. Such a circuit would be termed a safety circuit. It will be noted on Figs. 2 and 3 that the magnet, CB, is connected in series with the resistance unit, R, shunting which is a lever switch, S. The purpose of this resistance unit, R, is to reduce the current flow when the magnet, CB, has attracted its core to a point when the contacts which are carried thereby are closed; and also to prevent the circuit breaker, CB, closing after it has been deënergized by an interruption of the safety circuit at contacts, F, without first manually closing lever switch, S. It will be noted that it requires much less current flow to retain magnet, CB, with its contacts closed than it does to permit magnet, CB, to pick up when once its core has been permitted to fall and thus open the circuits connected therewith.

I have shown in Fig. 1 how the windings, A and B, may be made to attract an armature, E, by means of alternating current and armature, D, by means of direct current. I have also shown in Fig. 2 how this combined safety circuit and indication device may be made to serve two purposes in an interlocking system having alternating current for the prime source of energy for moving the switches and having continuous currents for indicating purposes; and I have also shown in Fig. 3 how this combined safety circuit controller and indication device may be embodied in a system having continuous current for the prime source of energy for moving the switches and having an alternating current source of energy for indicating purposes.

What I claim as my invention and desire to secure by Letters Patent is:

1. In combination with a traffic controlling system, combined electro-magnetic safety circuit controller and indication means, comprising one electromagnet and two armatures; the said magnet attracting one armature when energized by alternating current and the other armature when energized by continuous current, either armature being used for indication means when the other is used for circuit controlling means.

2. In an electric traffic controlling system having a source of electric energy for operating and a source of electric energy for indicating, the indicating source being of different character than that of the operating source, a safety circuit for the control of the application of the operating source of energy to the system; and means to control the continuity of the safety circuit and to act as indication means, said means being adapted to interrupt the said safety circuit when energized by current of the character of the said operating source and also adapted to operate as indication means when energized by the currents of the characteristic of that of the said indicating source.

3. The combination of an electric traffic controlling system having a source of electric energy for operating and a source of electric energy for indicating, the indicating source being of different character than that of the operating source, a safety circuit for the control of the application of the operating source of energy to the system; an electromagnet; a device operated by the electromagnet to control the safety circuit; and a second device also operated by the same electromagnet to operate as indication means.

In testimony whereof I have affixed my signature in presence of two witnesses.

WADE H. REICHARD.

Witnesses:
BEULAH CARLE,
FREDERICK W. CAMERON.

Copies of this patent may be obtained for five cents each, by addressing the "Commissioner of Patents, Washington, D. C."